United States Patent [19]

Hale et al.

[11] Patent Number: 4,740,318

[45] Date of Patent: Apr. 26, 1988

[54] WELL DRILLING FLUIDS AND PROCESS FOR DRILLING WELLS

[75] Inventors: Arthur H. Hale, Sand Springs, Okla.; Horace F. Lawson, Downingtown, Pa.

[73] Assignee: Great Lakes Research Corp., Elizabethton, Tenn.

[21] Appl. No.: 808,715

[22] Filed: Dec. 13, 1985

[51] Int. Cl.$^4$ ............................................... C09K 7/02
[52] U.S. Cl. .................................. 252/8.514; 252/8.51
[58] Field of Search ............... 252/8.5 A, 8.5 C, 8.51, 252/8.514

[56] References Cited

U.S. PATENT DOCUMENTS

| | | | |
|---|---|---|---|
| 2,552,775 | 5/1951 | Fischer | 252/8.5 |
| 2,650,905 | 9/1953 | Fordyce et al. | 252/8.5 |
| 3,730,900 | 5/1973 | Perricone et al. | 252/8.5 |
| 4,374,733 | 2/1983 | Snyder et al. | 210/701 |
| 4,476,029 | 10/1984 | Sy et al. | 252/8.5 |
| 4,536,296 | 8/1985 | Vio | 252/8.5 |
| 4,554,307 | 11/1985 | Farrar et al. | 252/8.5 |

*Primary Examiner*—Herbert B. Guynn
*Attorney, Agent, or Firm*—A. J. Good; R. Laddie Taylor; C. R. Reap

[57] ABSTRACT

The rheological characteristics of aqueous well drilling fluids are improved by incorporating into the fluids small amounts of sulfonated styrene-maleic anhydride copolymers and at least one water-soluble polymer prepared from acrylic acid or acrylamide or their derivatives.

6 Claims, No Drawings

WELL DRILLING FLUIDS AND PROCESS FOR DRILLING WELLS

BACKGROUND OF THE INVENTION

This invention relates to aqueous well drilling fluids and more particularly to improved dispersants for aqueous well drilling fluids.

When drilling wells, particularly oil and gas wells it is common practice to circulate a liquid medium into the borehole. The liquid medium, commonly referred to as a drilling fluid or a drilling mud, serves several functions in the well-drilling process. For example, the drilling fluid serves as a vehicle for removing drilling cuttings from the borehole. Another function of the drilling fluid is to cool and lubricate the drill bit. Other functions are to support part of the weight of the drill string and to transmit hydraulic power to the drill bit. Another consideration is that the drilling fluid should be formulated and applied in such a manner that minimal formation damage results and therefore minimal clogging of the oil-bearing strata occurs. To accomplish these functions the drilling fluid should have three major properties: It must provide weight, i.e. hydrostatic head; it must have good flow properties, i.e. good rheological properties; and it must provide filtration control.

A drilling fluid is essentially one of three types, a solids laden fluid with an aqueous continuous phase; a solids laden fluid with a hydrocarbon base; and gaseous. The present invention concerns the first category, that is well-drilling fluids having a continuous aqueous phase, commonly referred to as aqueous drilling fluids.

One of the principal problems encountered in well-drilling operations is that the drilling process requirements continually change due to continuously changing drilling environments. For example, as the depth of the well increases the temperature and pressure in the region of the drill bit increases. Furthermore, contaminants such as drill cuttings, formation water and salts enter the drilling zone. Also, as the drilling proceeds through different strata tne mineral constitution of the earth changes. To minimize any adverse effect from these factors additives are incorporated into the drilling fluid from time to time. The present invention relates to one of these additives, a dispersant (also commonly referred to as a "thinning agent").

DESCRIPTION OF THE PRIOR ART

The principal function of the dispersant in a drilling fluid is to maintain the properties of the drilling fluid in the various environments encountered by the drilling fluid. Many different dispersants have been used in the past with varying degree of success. Earlier dispersants included phosphates, tannins, lignite and lignin (lignosulfonate). These earlier dispersants had serious shortcomings, such as ineffectiveness at higher temperatures and sensitivity to salts such as sodium-and calcium-based materials.

Later dispersants, such as polyacrylates and copolymers of styrene and maleic anhydride have superior performance at high temperatures but these materials likewise have drawbacks. Sulfonated styrene-maleic anhydride copolymers are quite expensive and are somewhat sensitive to certain environment such as those containing high concentration of salts of calcium and other alkali and alkaline earth metals. Furthermore, these dispersant systems do not always efficiently disperse solids at higher concentration levels such as those resulting from the addition of gel, e.g. bentonite, to drilling muds or resulting form the accumulation of drill cuttings due to poor solids control. Acrylic-based polymers are less expensive than sulfonated styrene-maleic anhydride copolymers but they too exhibit sensitivity to salts. Acrylic-based polymers are effective dispersants of solids, such as bentonite, clays, drill cuttings, etc. Dispersants for well-drilling fluids which can be used in a variety of environments and which are not so subject to the above mentioned shortcomings are constantly being sought. The present invention presents a family of novel well-drilling dispersants which eliminate or lessen the adverse impact of some of the disadvantages of earlier dispersants.

The use of polymeric substances for water treatment has been disclosed in the patent literature. U.S. Pat. No. 4,374,733 (Snyder et al) discloses the use of combinations of styrene-maleic anhydride copolymers and acrylic acid-alkylhydroxy acrylate copolymers as scale inhibitors and dispersants for solid particulate matter, particularly including iron oxide and clay, in cooling water systems. U.S. Pat. No. 4,324,664 (Snyder et al) discloses the use of combinations of acrylic acid-alkyl hydroxylated acrylate copolymers and esters of aliphatic sulpho-dicarboxylic acid as dispersants for inorganic and organic matter in boiler and cooling water systems. U.S. Pat. No. 4,029,577 (Godlewski et al) teaches the use of acrylic acid-hydroxylated alkyl acrylate copolymers to control the formation and deposition of scale and suspended solid matter in aqueous media. U.S. Pat. No. 3,663,448 (Ralston) discloses the use of combinations of amino phosphonate compounds and polyacrylic acid, polyacrylamide or copolymers of acrylic acid and acrylamide to inhibit the formation of scale-forming salts. U.S. Pat. No. 4,209,398 discloses the use of combinations of polymers of ethylenically unsaturated compounds containing carboxyl radicals and phosphates or phosphonates to prevent scale formation. U.S. Pat. No. 2,723,956 (Johnson) teaches the use of copolymers of maleic anhydride and other ethylenic compounds, such as styrene or methyl methacrylate, for boiler scale treatment. U.S. Pat. No. 3,549,538 (Jacklin) discloses the use of combinations of nitrilo phosphonates or nitrilo carboxylates and polymers, such as styrene-maleic anhydride copolymer or acrylic acid homo- or copolymers, as scale inhibiting compositions. U.S. Pat. No. 3,650,970 (Pratt et al) discloses the use of esters of sytrene-maleic anhydride copolymers to inhibit the formation of scale. U.S. Pat. No. 4,288,327 (Godlewski et al) discloses the use of sulfonated styrene-maleic anhydride copolymers to disperse solids, such as iron oxide or clay, in aqueous media.

Some of the above compositions have been described in the patent literature as useful for drilling mud dispersants. For example U.S. Pat. No. 3,730,900 (Perricone et al) discloses the use of sulfonated styrene-maleic anhydride copolymers as dispersants for aqueous drilling fluids. U.S. Pat. No. 4,518,510 (Gleason et al) discloses the use of water-soluble sulfonated vinyl toluene-maleic anhydride copolymers as dispersants for drilling muds.

OBJECTS

It is an object of the invention to present novel dispersant systems for well-drilling fluids. It is another object of the invention to present well-drilling fluids which are particularly effective in high temperature environments. It is another object of the invention to present well drilling fluids which are effective in various substrata. It is another object of the invention to present an improved method for drilling wells in high temperature environments. It is another object of the invention to present an improved method of drilling wells in substrata of varying composition. These and other objects of the invention will become apparent upon reading the following description and examples.

SUMMARY

The above objects are achieved by using as the dispersant in a well-drilling fluid a system comprised of a water soluble sulfonated stryene-maleic anhydride copolymer and one or more water-soluble polymers prepared from arcylic acid or acrylamide, derivatives of arcylic acid and/or acrylamide or mixtures of any of these monomers. Details relating to the molecular weight ranges of these polymers and their dosages and relative proportions are disclosed in following description.

DETAILED DESCRIPTION

The sulfonated styrene-maleic anhydride copolymer must be substantially water-soluble to perform satisfactorily in the process of the invention. The water-solubility of the sulfonated styrene-maleic anhydride copolymer is influenced by both the molecular weight of the copolymer and the presence of the sulfonate groups on the styrene ring. As the molecular weight of the coployment increases its water-solubility decreases. Suitable sulfonated copolymers are prepared from styrene-maleic anhydride copolymers having a lower weight average molecular weight limit of about 500. The lower molecular weight limit is generally about 1000 and preferably at least about 1500. The upper weight average molecular weight limit is generally about 15,000 and usually not greater than 10,000. The preferred weight average molecular weight limit is preferably not greater than about 5,000. The above molecular weight limits are before sulfonation and, accordingly, do not include the weighting of the sulfonate groups.

The sulfonate groups improve the water soluility of the copolymer. While the base resin is soluble at a pH of 8 or greater, sulfonation extends the soluble range to lower pHs. The sulfonated styrene-maleic anhydride copolymer contains a sufficient number of sulfonate groups to render the given copolymer watersoluble. The maleic moiety of the copolymer may be in the form of the acid or anhydride or the alkali metal salts of the acid.

The molar ratio of stryene to maleic anhydride units may vary over a wide range. For example, the molar ratio may vary from 100 moles of sulfonated styrene per each mole of maleic anhydride to about 1 mole of sulfonated styrene per each 10 moles of maleic anhydride. It is usually preferred to maintain the ratio of styrene units to maleic anhydride units in the copolymer in the range of about 10:1 to about 1:4. In the most preferred embodiments the molar ratio of styrene units to maleic anhydride units is in the range of about 4:1 to 1:2.

The water-soluble sulfonated styrene-maleic anhydride copolymer can be prepared by any polymerization technique which will produce a copolymer having the desired characteristics. One procedure for preparing suitable styrene-maleic anhydride copolymer is described in the above mentioned U.S. Pat. No. 3,730,900.

The water-soluble acrylic polymer may be prepared from a wide variety of acrylic-type monomeric materials. In general, suitable polymers are prepared from monomers of one or more of the following categories: acrylic acid and alkyl-substituted acrylic acids and their salts and ester derivatives and acrylamide and alkyl substituted acrylamides and their derivatives. Copolymers prepared from two or more of these monomers and mixtures of homopolymers and copolymers prepared from these acrylic type monomers may also be used in the invention.

The acrylic polymer component used in the invention must be water-soluble. Water-solubility is generally accomplished by selecting polymers having upper weight average molecular weight limits of not greater than about 30,000. Usually the upper weight average molecular weight limit is not greater than about 15,000. The preferred upper molecular weight limit is generally about 10,000. The upper molecular weight limit is determined primarily by the water solubility of the polymer. The lower molecular weight limit is generally about 500 (weight average) and is usually about 1,000. The preferred lower weight average molecular weight limit is about 1,500. It is to be understood, of course, that any of the above arcylic type polymers can be used regardless of molecular weight provided they are water-soluble.

Suitable acrylic acid and related derivative monomers include acrylic acid, alpha-alkyl substituted acrylic acid, alkyl and hydroxyalkyl esters of acrylic acid and the above alpha-alkyl-substituted acrylic acids and the alkali metal salts of acrylic acid and alpha-alkyl substituted acrylic acids.

Alpha-alkyl-substituted acrylic acids include those having 1 to about 6 and preferably 1 to about 3 alpha-alkyl carbon atoms. Typical alkyl acrylic esters are those having about 1 to about 10 and preferably 1 to about 4 alkyl ester carbon atoms. Suitable hydroxyalkyl acrylic esters are those having 1 to about 10 and perferably 1 to about 4 carbon atoms and 1 to about 4 and preferably 1 to about 2 hydroxyl groups in the ester moiety of the molecule. The water-soluble salts include the alkali metal salts, such as the sodium, potassium and lithium salts of acrylic or any of the above mentioned substituted acrylic acids and the ammonium salts of these acids.

Acrylic acid and derivative acid monomers include acrylic acid, alpha methacrylic acid, alpha ethacrylic acid, etc. The preferred acrylic acid monomers include acrylic acid and alpha methacrylic acid.

Alkyl acrylic esters include, methyl acrylate, ethyl acrylate, isopropyl acrylate, butyl acrylate, hexyl acrylate, methyl methacrylate ethyl methacrylic, methyl alphapropyl acrylate, butyl ethacrylate, etc. Preferred alkyl esters are the lower esters, such as methyl acrylate, ethylacrylate, methyl ethacrylate, ethyl ethacrylate, etc.

Hydroxyalkyl esters of the above acrylic acids include hydroxymethyl acrylate, hydroxyethyl acrylate, hydroxypropyl acrylate, hydroxypropyl methacrylate, 2,3-dihydroxypropyl acrylate, 1,3-dihydroxybutyl methacrylate, etc.

Suitable acrylamide and related derivative monomers include acrylamide, alpha-alkyl-substituted acrylamides containing 1 to about 6 aplha-alkyl carbon atoms and nitrogen mono- or dialkyl substituents each containing 1 to about 6 alkyl carbon atoms.

The relative amounts of sulfonated styrene-maleic anhydride copolymer and acrylic polymer may vary from styrene-maleic anhydride copolymer to acrylic polymer weight ratios of about 90:10 to 5:95, depending upon the particular drilling mud formulation employed and the nature of the formation being drilled. Sulfonated styrene-maleic anhydride copolymer to acrylic polymer weight ratios in the range of about 80:20 to 10:90 are usually preferred for most applications.

The total amount of water-soluble sulfonated styrene-maleic anhydride copolymer and water-soluble acrylic polymer required in the compositions of the invention to produce the desired result will vary over a wide range as the drilling mud formulation and subterranean formation composition vary. In general the required amount of each of these components can vary from about 0.05 lbs/bbl (pounds per barrel of total drilling mud formulation) to about 10 lbs/bbl. Amounts in the range of about 0.1 to 5 lbs/bbl. are usually preferred for most drilling mud applications.

The invention is further illustrated in the following examples in which parts and percentages are on a weight basis, unless otherwise indicated.

EXAMPLE 1

A synthetic drilling fluid base mud was prepared as follows: A mixture comprised of 252 g of water and 10 g of bentonite clay was blended in a multimixer sufficiently to hydrate the bentonite. Next 50 g of kaolinite clay and 416 g of barite were blended into the hydrated bentonite and the pH of the resulting mixture was adjusted to 10 with concentrated sodium hydroxide.

Test drilling fluid samples were prepared by blending polymeric dispersants with the above-described base mud at several concentration levels. These levels are equivalent to dispersant loadings of 0.1, 0.15, 0.2 and 0.3 pounds per barrel (lb/bbl.) Test samples of three polymeric dispersants were prepared at each concentration level. The dispersants used in these samples were a sulfonated styrene-maleic anhydride copolymer having a 1:1 styrene to maleic anhydride molar ratio, a presulfonationnumber average molecular weight of about 1600 and a sulfonate to styrene ratio of about 0.66, sold by ChemLink Petroleum, Inc. under the trademark SSMA TM 1000L; a sodium acrylate-sodium methacrylate copolymer sold by ChemLink Petroleum, Inc. under the trademark OFC TM 1260 Scale Inhibitor Intermediate and a 50/50 weight percent mixture of SSMA 1000L and OFC 1260. A control sample which contained no dispersant was also prepared. Each of the test samples and the control sample were aged by hot rolling at 150° F. (65.5° C.) for 16 hours. The samples were cooled to room temperature, mixed in a multimixer for ten minutes and tested for rheological characteristics using a Fann Model 35A rheometer. The plastic viscosity (PV) in centipoises (cp) and the yield point in pounds per 100 square feet were calculated and the 100 second and 10 minute gel strengths were measured for each test. The results are tabulated in TABLE I.

TABLE I

| (Control, no dispersant) | |
|---|---|
| Plastic Viscosity (PV), cp | 41 |
| Yield Point (YP) lb/100 ft$^2$ | 28 |
| 10 Sec gel strength (GS), lb/100 ft$^2$ | 10 |
| 10 Min gel strength (GS), lb/100 ft$^2$ | 25 |

| DISPERSANT | SSMA TM 1000L | OFC TM 1260 | SSMA 1000L/ OFC 1260 |
|---|---|---|---|
| Series 1 (0.1 lb/bbl dispersant concentration) | | | |

TABLE I-continued

| | | | |
|---|---|---|---|
| PV, cp. | 38 | 37 | 42 |
| YP, lb/100 ft$^2$ | 26 | 20 | 15 |
| 10 Sec GS, lb/100 ft$^2$ | 4 | 5 | 4 |
| 10 Min GS, lb/100 ft$^2$ | 14 | 14 | 15 |
| Series 2 (0.15 lb/bbl dispersant concentration) | | | |
| PV, cp | 45 | 43 | 43 |
| YP, lb/100 ft$^2$ | 21 | 14 | 11 |
| 10 Sec GS, lb/100 ft$^2$ | 3 | 2 | 2 |
| 10 Min GS, lb/100 ft$^2$ | 15 | 15 | 10 |
| Series 3 (0.2 lb/bbl. dispersant concentration) | | | |
| PV, cp | 40 | 39 | 38 |
| YP, lb/100 ft$^2$ | 15 | 13 | 7 |
| 10 Sec GS, lb/100 ft$^2$ | 3 | 2 | 2 |
| 10 Min GS, lb/100 ft$^2$ | 9 | 10 | 5 |
| Series 4 (0.3 lb/bbl. dispersant concentration) | | | |
| PV, cp | 40 | 36 | 38 |
| YP, lb/100 ft$^2$ | 9 | 8 | 4 |
| 10 Sec GS, lb/100 ft$^2$ | 2 | 2 | 1 |
| 10 Min GS, lb/100 ft$^2$ | 7 | 4 | 2 |

This example illustrates the benefit obtained by the use of a 50/50 weight percent mixture of SSMA 1000L and OFC 1260. Each dispersant-containing sample had better physical property values than the control sample. However, in each run the 50/50 polymer blend sample had better properties than either of the samples containing only one polymer in almost every case. The improvement in yield point and 10 minute gel strength is particularly significant at the higher concentrations.

EXAMPLE II

Samples were prepared as described in EXAMPLE I. These samples were aged by hot rolling first at 150° F. (65.5° C.) for 16 hours and then at 400° F. (204.4° C.) for 16 hours. The rheological properties of each sample are determined as in EXAMPLE I. The results are tabulated in TABLE II.

TABLE II

| (Control, no dispersant) | |
|---|---|
| PV. cp | 41 |
| YP, lb/100 ft$^2$ | 38 |
| 10 Sec GS, lb/100 ft$^2$ | 27 |
| 10 Min GS, lb/100 ft$^2$ | 31 |

| DISPERSANT | SSMA 1000L | OFC 1260 | SSMA 1000L OFC 1260 |
|---|---|---|---|
| Series 1 (0.1 lb/bbl. dispersant concentration) | | | |
| PV, cp. | 44 | 55 | 62 |
| YP, lb/100 ft$^2$ | 41 | 31 | 18 |
| 10 Sec GS, lb/100 ft$^2$ | 21 | 15 | 15 |
| 10 Min GS, lb/100 ft$^2$ | 27 | 20 | 18 |
| Series 2 (0.15 lb/bbl. dispersant concentration) | | | |
| PV, cp. | 41 | 57 | 64 |
| YP, lb/100 ft$^2$ | 36 | 26 | 13 |
| 10 Sec GS, lb/100 ft$^2$ | 20 | 10 | 10 |
| 10 Min GS, lb/100 ft$^2$ | 26 | 15 | 13 |
| Series 3 (0.2 lb/bbl. dispersant concentration) | | | |
| PV, cp. | 49 | 57 | 63 |
| YP, lb/100 ft$^2$ | 31 | 26 | 14 |
| 10 Sec GS, lb/100 ft$^2$ | 19 | 6 | 6 |
| 10 Min GS, lb/100 ft$^2$ | 25 | 12 | 10 |
| Series 4 (0.3 lb/bbl. dispersant concentration) | | | |
| PV, cp. | 61 | 63 | 65 |
| YP, lb/100 ft$^2$ | 18 | 14 | 7 |
| 10 Sec GS, lb/100 ft$^2$ | 9 | 3 | 2 |
| 10 Min GS, lb/100 ft$^2$ | 12 | 6 | 6 |

Example II demonstrates that the compositions of the invention have good heat stability. In each series the sample containing the SSMA 1000L/OFC 1260 blend exhibits a significantly lower yield point than the samples containing only SSMA 1000L or OFC 1260. Furthermore the gel strengths of the samples containing the polymer blend are superior to those containing only one component of the polymer blend.

EXAMPLE III

Drilling fluid test samples having varying SSMA 1000L to OFC 1260 weight ratios were prepared in accordance with the procedure of EXAMPLE I. The Runs 2 to 8 samples contained a total dispersant concentration of 0.05 lb/bbl. The Run 2 sample contained only SSMA 1000L dispersant; the Run 8 sample contained only OFC 1260 dispersant and the Runs 3-7 samples contained mixtures of SSMA 1000L and OFC 1260 at the indicated weight percentages. Physical tests were conducted on these samples as in EXAMPLE I. The results are tabulated in TABLE III.

TABLE III

| SSMA 1000L/OFC 1260 Weight percentages | Run | | | | | | | |
|---|---|---|---|---|---|---|---|---|
| | 1 0/0 | 2 100/0 | 3 90/10 | 4 75/25 | 5 50/50 | 6 25/75 | 7 10/90 | 8 0/100 |
| PV cps | 32 | 32 | 32 | 36 | 36 | 37 | 35 | 35 |
| YP, lb/100 ft$^2$ | 18 | 11 | 8 | 6 | 1 | 1 | 0 | 6 |
| 10 sec gel strength, lb/100 ft$^2$ | 16 | 6 | 7 | 3 | 2 | 2 | 2 | 3 |
| 10 sec gel strength, lb/100 ft$^2$ | 24 | 18 | 15 | 13 | 6 | 5 | 7 | 14 |

Example III shows the synergistic results obtained by the use of various ratios of SSMA 1000L to OFC 1260. Run 1, which contained no dispersant, had the highest yield point and 10 second and 10 minute gel strengths. The yield points, 10 second gel strengths and 10 minute gel strengths of the Runs 3 to 7 samples, which contained blends of SSMA 1000L and OFC 1260 at various ratios, were all lower than the corresponding values for the Run 2 sample, which contained only SSMA 1000L and the Run 8 sample, which contained only OFC 1260.

Although the specific examples illustrate the invention it is understood that the invention is not limited to the scope of the examples.

What is claimed is:

1. A composition comprised of
   (a) a aqueous base,
   (b) a clayey material suspended in said aqueous base,
   (c) a water-soluble sulfonated styrene-maleic anhydride copolymer having a molecular weight of about 500 to about 10,000,
   (d) a water-soluble methacrylate copolymer having a molecular weight of about 500 to about 30,000 consisting of polymerized units of an alkali metal salt of acrylic acid and an alkali metal salt of methacrylic acid, the combined total weight of the polymers of (c) and (d) present in the composition being in the range of about 0.05 to about 10.0 pounds per barrel of composition and the weight ratio of the polymer of (c) to the polymer of (d) being in the range of about 90:10 to about 5:95.

2. The composition of claim 1 wherein the ratio of sulfonated styrene units to maleic anhydride units is about 100:1 to 1:10.

3. The composition of either of claims 1 or 2 wherein the clayey material is bentonite.

4. In a well-drilling method wherein an aqueous drilling fluid is circulated in the borehole the improvement comprising using as the drilling fluid the composition of claim 1.

5. The improved method of claim 4 wherein the ratio of styrene units to maleic anhydride units in said copolymer is about 100:1 to 1:10.

6. The improved method of either of claims 4 or 5 wherein the clayey material is bentonite.

* * * * *

UNITED STATES PATENT AND TRADEMARK OFFICE
CERTIFICATE OF CORRECTION

PATENT NO. : 4,740,318
DATED : April 26, 1988
INVENTOR(S) : Arthur H. Hale et al It is certified that error appears in the above—identified patent and that said Letters Patent is hereby corrected as shown below: on the Title Page at Item [73].

[73] Assignee: "Great Lakes Research Corp."

corrected to -- Pony Industries, Inc. --

Signed and Sealed this

Eleventh Day of October, 1988

Attest:

DONALD J. QUIGG

Attesting Officer

Commissioner of Patents and Trademarks